US008600292B2

(12) United States Patent
Jalali

(10) Patent No.: US 8,600,292 B2
(45) Date of Patent: Dec. 3, 2013

(54) BEAM FOCUSING IN MULTI-BEAM SATELLITE SYSTEMS BY COMBINING SIGNALS FROM MULTIPLE SATELLITE BEAMS ON THE GROUND

(75) Inventor: Ahmad Jalali, Rancho Santa Fe, CA (US)

(73) Assignee: QUALCOMM Incorporated, San Diego, CA (US)

( * ) Notice: Subject to any disclaimer, the term of this patent is extended or adjusted under 35 U.S.C. 154(b) by 741 days.

(21) Appl. No.: 11/555,859

(22) Filed: Nov. 2, 2006

(65) Prior Publication Data
US 2008/0001812 A1 Jan. 3, 2008

Related U.S. Application Data

(60) Provisional application No. 60/817,578, filed on Jun. 30, 2006.

(51) Int. Cl.
*H04H 20/74* (2008.01)
(52) U.S. Cl.
USPC ........ 455/3.02; 455/63.1; 455/427; 455/12.1; 455/98; 342/352; 342/354; 342/356
(58) Field of Classification Search
USPC ......... 370/354; 455/12.1, 13.3, 63.1, 427, 98; 342/352, 354, 356
See application file for complete search history.

(56) References Cited

U.S. PATENT DOCUMENTS

| | | | | |
|---|---|---|---|---|
| 5,903,549 A | * | 5/1999 | von der Embse et al. | .... 370/310 |
| 2005/0136836 A1 | * | 6/2005 | Karabinis et al. | ............ 455/12.1 |
| 2005/0260947 A1 | * | 11/2005 | Karabinis et al. | ............ 455/12.1 |
| 2006/0189309 A1 | * | 8/2006 | Good et al. | ................... 455/427 |
| 2007/0135051 A1 | * | 6/2007 | Zheng et al. | ................ 455/63.1 |

FOREIGN PATENT DOCUMENTS

WO 2005117288 A 12/2005

OTHER PUBLICATIONS

Al-Asady et al. "High Speed Satellite Mobile Communications: Technologies and Callenges". Proceedings of the IEEE, IEEE, New York, US. vol. 92, No. 1.
International Search Report dated Dec. 28, 2007, serial No. PCT/US2007/072276, 3 pages.
Taiwanese Office Action for TW application No. 096123820 mailed Sep. 23, 2011 (untranslated), 6 pages.
Written Opinion—PCT/US2007/072276—ISA/EPO—Dec. 28, 2007.

* cited by examiner

*Primary Examiner* — Khalid Shaheed
(74) *Attorney, Agent, or Firm* — Ashish L. Patel

(57) ABSTRACT

A satellite communication system designed to communicate with wireless communication devices (WCDs) by use of a mosaic pattern of signal beams uses multiple beams to augment the communication with individual WCDs. In addition to communication with a WCD through a primary beam for that WCD, adjacent beams are used, but with signals utilizing circuit parameters assigned to the primary beam. The signals from a given WCD are relayed in a backhaul, either as an aggregate signal processed by the satellite, or as backhaul communication signals to be combined or separated on the ground.

36 Claims, 4 Drawing Sheets

BEAM FOCUSING IN MULTI-BEAM SATELLITE SYSTEMS BY COMBINING SIGNALS FROM MULTIPLE SATELLITE BEAMS ON THE GROUND

CLAIM OF PRIORITY UNDER 35 U.S.C. §119

The present application for patent claims priority to Provisional Application No. 60/817,578 entitled "BEAM FOCUSING IN MULTI-BEAM SATELLITE SYSTEMS BY COMBINING SIGNALS FROM MULTIPLE SATELLITE BEAMS ON THE GROUND" filed Jun. 30, 2006, and assigned to the assignee hereof and hereby expressly incorporated by reference herein.

BACKGROUND OF THE INVENTION

1. Field of the Invention

This invention relates to on-ground beam forming to enhance gain to a desired user.

2. Background

Various satellite communication systems have been developed over the years. One early system architecture is referred to as Time Division Multiple Access (TDMA) and is characterized by assignment of time slots in a communication channel to each of a plurality of terminals, and with communication with the terminals taking place in the specifically assigned time slots. An improved system architecture is referred to as Code Division Multiple Access (CDMA). CDMA based communication systems generally provide greater bandwidth efficiency than do TDMA based communication systems.

In general, signal strength is a critical factor in establishing a communication link with good quality of service (QoS). In the case of satellite communications with multiple subscribers, the signal strength provided to subscribers' wireless communication devices (WCDs) by the satellite and by the WCDs to the satellite is limited. In addition, satellite coverage area is divided into plural beams, which are of limited geographical area.

If it can be determined which beam coincides with a WCD's physical location, the communication can be established within that beam. For the purposes of this description, the beam to which the WCD is assigned is the primary beam. Other WCDs are assigned beams as primary beams, so that this description of the primary beam is dependent on the location of a particular WCD with which an air link is established. In other words, the reference to a "primary beam" is dependent on which WCD is being described in connection with the communication and is dependent on the physical location of that WCD.

The backhaul is transmitted and received through one or more gateways. The backhaul corresponds to communication link between the satellite and the gateways, with the degree of processing performed by the satellite a matter of the particular design of the satellite.

SUMMARY

According to the present invention, a multi-beam satellite system in which multiple beams provide coverage to a geographical region using a pattern of signal beams provides enhanced coverage. Communication is established in at least one of an uplink and a downlink with at least one of the WCDs in a multiple beams, and backhaul communication corresponding to the communicated signals in a backhaul transmission are communicated through at least one gateway. A portion of the backhaul communication corresponds to respective ones of the beams corresponding to signals communicated through a primary beam and a secondary beam.

In another aspect of the present invention, a satellite communicates with wireless communication devices (WCDs) in a multi-beam system, in which the beams provide coverage to a geographical region and using a repeating signal parameter pattern, and at least two adjacent beams have different signal parameters. A circuit assigns a set of signal parameters for each of the beams in accordance with the repeating signal parameter pattern. A communication circuit then communicates signals with WCDs in accordance with the assigned signal parameters. A gateway circuit communicates corresponding signals in a backhaul transmission, with at least some of the corresponding signals corresponding to signals communicated via respective ones of the beams. The backhaul communication includes signals corresponding to signals communicated with the WCDs through a primary beam and also through a secondary beam according to circuit parameters assigned to the primary beam.

According to a further aspect of the present invention, a multi-beam satellite system in which multiple beams provide coverage to a geographical region using a repeating signal parameter pattern provides enhanced coverage. A set of signal parameters is assigned for each of the beams in accordance with the repeating signal parameter pattern, such that at least two adjacent beams have different signal parameters. Communication is established in at least one of an uplink and a downlink with at least one of the WCDs in a multiple beams, and backhaul communication corresponding to the communicated signals in a backhaul transmission are communicated through at least one gateway. A portion of the backhaul communication corresponds to respective ones of the beams corresponding to signals communicated through a primary beam and a secondary beam according to circuit parameters assigned to the primary beam.

In accordance with the present invention, a method of enhancing communication coverage is provided in a multi-beam satellite system in which a plurality of beams provide coverage to a geographical region using a pattern of signal beams. Signals are assigned for each of the plurality of beams. The signals are communicated in at least one of an uplink and a downlink, with a plurality of wireless communication devices (WCDs), including with at least one of the WCDs in at least one of the uplink and downlink in a plurality of the beams. Backhaul communication corresponding to the communicated signals are provided in a backhaul transmission through at least one gateway, and at least a subset of the backhaul communication corresponding to respective ones of the plurality of beams such that the backhaul communication includes signals corresponding to signals communicated with one of the WCDs through a primary beam and a secondary beam.

In accordance with a further aspect of the present invention, a satellite for communicating with a plurality of wireless communication devices (WCDs) in a multi-beam system in which a plurality of beams provide coverage to a geographical region and using a signal parameter pattern in which at least two adjacent beams have different signal parameters. The satellite includes a circuit assigning a set of signal parameters for each of the plurality of beams in accordance with the signal parameter pattern, a circuit communicating signals with a plurality of wireless communication devices (WCDs) in accordance with the assigned signal parameters, and a circuit communicating corresponding signals in a backhaul transmission through at least one gateway. A portion of the corresponding signals corresponds to signals communicated via the plurality of beams such that the backhaul communication includes signals corresponding to signals communicated with one of the WCDs through a primary beam and a secondary beam according to circuit parameters assigned to the primary beam.

In accordance with a further aspect of the present invention, a communication device for use in a multi-beam satellite system in which a plurality of beams provide coverage to a geographical region using a signal parameter pattern in which at least two adjacent beams have different signal parameters, includes means for assigning signal parameters for each of the plurality of beams in accordance with the signal parameter pattern, and means to process signals in at least one of an uplink and a downlink. The means to process signals in the uplink or downlink communicates with a plurality of wireless communication devices (WCDs) in at least one of the uplink and downlink in a plurality of the beams.

In accordance with a further aspect of the present invention, a method of using a backhaul in a multi-beam satellite system in which a plurality of beams provide coverage to a geographical region using a signal parameter pattern in which at least two adjacent beams have different signal parameters includes providing a backhaul communication, communicating through the backhaul and providing at least a subset of backhaul communications corresponding to respective ones of a plurality of beams. The backhaul corresponds to communications provided for each of at least a subset of the plurality of beams in accordance with the signal parameter pattern, and the communication through the backhaul corresponds to at least one of an uplink and a downlink with a plurality of wireless communication devices (WCDs). The corresponding signals include communications with at least one of the WCDs in at least one of the uplink and downlink in a plurality of the beams. The backhaul communications correspond to the communicated signals with the plurality of WCDs, and at least one of the WCDs communicates through more than one beam.

In accordance with a further aspect of the invention, a chipset including at least one semiconductor integrated circuit chip is used in a WCD. The chipset includes a circuit capable of receiving an assigned set of signal parameters corresponding to at least one of a plurality of beams, and a circuit capable of effecting communication of signals. The communication of signals is accomplished in at least one of an uplink and a downlink in a plurality of the beams having different signal parameters. In a particular aspect of the invention, the chipset includes a circuit capable processing a combination of signals received from at least two of said beams using a combining algorithm. The combining algorithm may be, by way of example, a maximal ratio combining (MRC) algorithm or a minimal mean squared error combining (MMSE) algorithm.

BRIEF DESCRIPTION OF THE DRAWINGS

The features, nature, and advantages of the present invention will become more apparent from the detailed description set forth below when taken in conjunction with the drawings in which like reference characters identify corresponding items throughout and wherein.

DETAILED DESCRIPTION OF THE INVENTION

Figure 1:
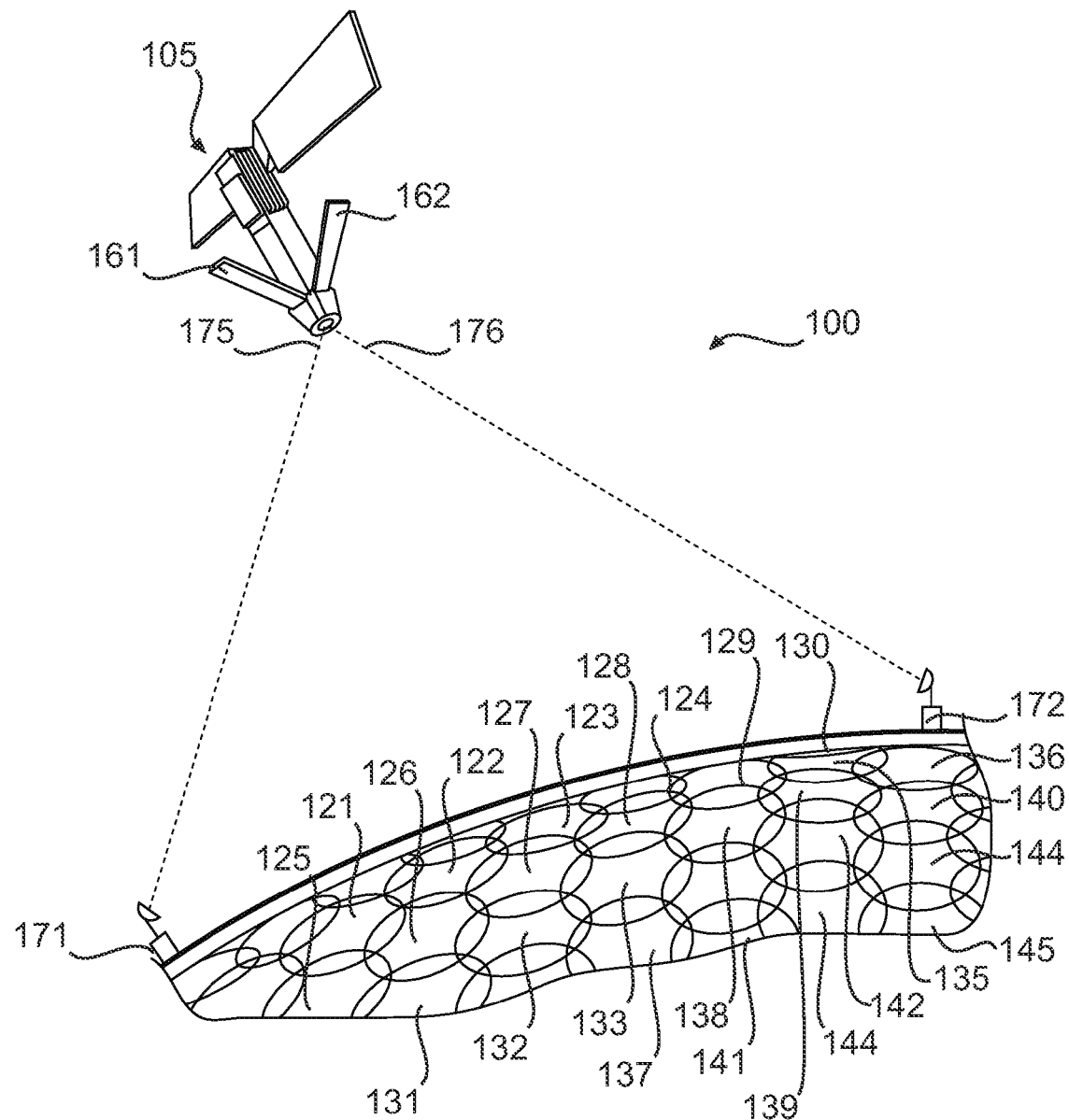
FIG. 1 is a diagram illustrating an example of a satellite communication network.

The word "exemplary" is used herein to mean "serving as an example, instance, or illustration." Any embodiment described herein as "exemplary" is not necessarily to be construed as preferred or advantageous over other embodiments.

Overview

A typical multi-beam satellite system uses an array of beams to provide coverage to a geographical region. These systems typically use a pattern of signal beams. The signals corresponding to each beam are then processed on the ground to decode the user packets. The gain of the satellite beams roll off from the center of the beam where it has the largest gain to the edge of the beam where it has the smallest gain. Therefore, a user's wireless communication device (WCD) at the edge of the beam will receive a weaker signal and will have either a lower data rate or a smaller link margin; i.e., a less robust link.

A typical multi-beam satellite system uses an array of beams to provide coverage to a geographical region. These systems typically use a signal parameter pattern, in which different set of signal parameters are used for adjacent beams. On the uplink or return link from the user terminal to the satellite and then to the gateway, the signals in each beam is filtered by the satellite and is transmitted on a backhaul or feeder link from the satellite to the gateway. The signals corresponding to each beam are then processed on the ground to decode the user packets. The gain of the satellite beams roll off from the center of the beam where it has the largest gain to the edge of the beam where it has the smallest gain. The signal parameters may be frequency assignments, pseudonoise (PN) codes or other parameters, such that adjacent beams have different signal parameters.

One implementation of a multi-beam satellite system uses an array of beams to provide coverage to a geographical region. These systems typically use a signal parameter reuse pattern of K where a given set of signal parameters is used in one out of K beams. The signals corresponding to each beam are then processed on the ground to decode the user packets. The gain of the satellite beams roll off from the center of the beam where it has the largest gain to the edge of the beam where it has the smallest gain. The parameter reuse pattern is particularly useful for a frequency reuse system, in which the frequency assignments are provided in a reuse pattern. The parameter reuse pattern can also be used for pseudonoise (PN) codes or other parameters, in which adjacent beams have different signal parameters, with or without a requirement for reuse of the signal parameters.

It is therefore desired to provide a technique for providing higher gain to the WCDs at the edge of the beam. In doing so, the signal parameters used to communicate with the WCD in the primary beam is used, but communication using those signal parameters are also effected through one or more adjacent beams. In the case of a frequency reuse pattern in which adjacent beams have different frequency assignments, generally the frequency band that is allocated to each beam is backhauled to the gateway from each beam. In other words, in a given beam n generally the frequency band Bn assigned to beam n are backhauled to the ground from beam n. The signals received in beam n from the remaining available bandwidth to the system are not backhauled from beam n to the gateway. In one aspect of the inventive system each beam backhauls signals received in all frequencies regardless of the frequency reuse plan. It is then possible to further combine the signals in a given frequency from all beams of the satellite and extract a stronger signal for the desired user terminal. If the signals from all beams are combined with a combining algorithm, this effectively forms a beam whose boresight (maximum gain) is on the desired WCD, thereby maximizing the gain to that WCD. If an MMSE (Minimum Mean Squared Error) algorithm is used to combine the signals additional gain may be achieved by nulling some of the strong interferers.

It is also possible to configure a multi-beam satellite system in which the same frequencies are used in adjacent beams. CDMA communications are particularly adaptable to this type of system, since signals from adjacent beams do not present a significant interference problem. Therefore the same set of frequencies may be sued in adjacent beams. In such an arrangement, the frequency reuse results in the backhaul automatically carrying the signals of a WCD in its primary beam as well as the secondary beams.

Operational Environment

FIG. 1 is a diagram illustrating an example of a wireless communication network 100. In the FIGURE, a satellite communication system uses one or more satellites 105 which provides a signal coverage pattern using separate beams corresponding to coverage areas 121-145.

Each of the beams 121-145 are established with assigned signal parameters, so that communications within the beam are established in accordance with the assigned signal parameters. This reduces interference between beams.

The beams 121-145 are used to communicate with subscribers through wireless communication devices (WCDs, not shown in FIG. 1).

In addition to the beams 121-145, the satellite 105 communicates through one or more gateways, represented by ground stations 171, 172, typically through gateway antennas 175, 176, which are separate from the subscriber communication antennas 161, 162. The gateway communications are generally relayed through the satellite for all of the beams 121-145.

Normally, communication within a beam, e.g., beam 134 is established according to the assigned parameters for that particular beam 134. Beam 134 is given as an example, and in a satellite communication system, each of the beams 121-145 has the potential of being the primary beam. The boundary of the beam 134 is not clearly demarcated, and so transmissions from beam 134 are received to and from the coverage areas of adjacent beams. The signals received at the adjacent beams 128, 129, 135, 139, 138, or 133, provide additional reception as compared to the reception from beam 134 alone. In order to do this, the system 100 may accept signals received at the selected adjacent beams 128, 129, 135, 139, 138, or 133 that are transmitted according to at least a subset of the parameters assigned to the primary beam 134 for that transmission.

These signals designated for beam 134 but transmitted in one or more of the adjacent beams 128, 129, 135, 139, 138, or 133, are combined in accordance with signal combining algorithms. This is performed either at the satellite 105 or transmitted through the gateways 175, 176, for combining on the ground, in accordance with the particular techniques used by the satellite system 100 for relaying signals.

In a signal parameter reuse arrangement, adjacent beams have different signal parameters, such as frequency ranges or a set of pseudonoise (PN) codes, and each of the beams 121-145 are established with assigned signal parameters. Communications within the beam are established in accordance with the assigned signal parameters. The assigned parameters are altered in a mosaic pattern, so that adjacent beams have different parameters from one another. In the example of FIG. 1, beam 134 has different parameters from those of beams (viewing clockwise) 128, 129, 135, 139, 138, and 133. In addition, adjacent ones of the surrounding beams 128, 129, 135, 139, 138, and 133 are different from each other, but may repeat parameters of non-adjacent beams. This reduces interference between beams by allowing an air interface to be established without accounting for bandwidth use by adjacent beams.

By way of example, if a system 100 assigns 4 different sets of signal parameters A-B-C-D in a mosaic pattern for the beams 121-145, and if the primary beam happens to be assigned parameters C, then the adjacent beams 128, 129, 135, 139, 138, or 133 would be variously assigned signal parameters A, B and D, but generally not C. In this case, signals received from a WCD assigned to beam 134, but also received in the adjacent beams 128, 129, 135, 139, 138, would be received under signal parameters C, even though signal parameters C are specifically not assigned to adjacent beams 128, 129, 135, 139, 138, or 133. In other words, 128, 129, 135, 139, 138, or 133 are used to process signals belonging to a different beam, in this case beam 134.

It is also possible to transmit signals to the WCD though the primary beam 134 and augment the transmission with transmissions through one or more of the adjacent beams 128, 129, 135, 139, 138, or 133. Thus, if reception by a WCD is weak, it is possible to augment the signal provided to the WCD with signals transmitted in one or more of the adjacent beams 128, 129, 135, 139, 138, or 133.

Transmission Through Multiple Beams

The transmissions received by the satellite 105 are either combined at the satellite 105 and backhauled through communications through the gateways (175, 176) or are transmitted through the gateway and combined on the ground. In either case, the signal received by the satellite 105 through the multiple beams is resolved into a composite signal.

The composite signal is therefore a primary signal, received through the primary beam 134 assigned to the WCD, and additional signals. This by its nature, is a primary signal with a significant amount of interference. Signals from competing users are direct sources of co-channel interference, such as multiple access interference and inter-cell interference.

In order to provide an improvement on the primary signal (received through beam 134), a combining signal processing algorithm is employed to provide an optimized composite signal. Examples of combining signal processing algorithms include Maximal Ratio Combining (MRC), Minimal Mean Squared Error Combining (MMSE) and Equal Gain Combining (EGC). The purpose of these algorithms is to increase the signal to interference ratio of the combined signal. If the signals from all beams are combined with a combining algorithm, such as the maximal ratio combining algorithm where the signals are added coherently then this effectively forms a beam whose boresight (maximum gain) is on the desired WCD, thereby maximizing the gain to that WCD. If minimum mean squared combining algorithm is applied to the signals from all beams then additional gain may be achieved by nulling some of the strong interferers.

The combined signals tend to be most useful in cases where the WCD is near the edge of a beam, in which case there is a substantial amount of signal received at one or more adjacent beams. If the WCD is near the center of the beam, the relative signal strength received at adjacent beams is likely to be less, so that the improvement obtained by combining the signals from the primary beam 134 and adjacent beams 128, 129, 135, 139, 138, or 133 is not necessarily significant. By the use of a combining algorithm, the system 100 is able to automatically adapt to signal conditions and select an optimum combination.

Figure 2:
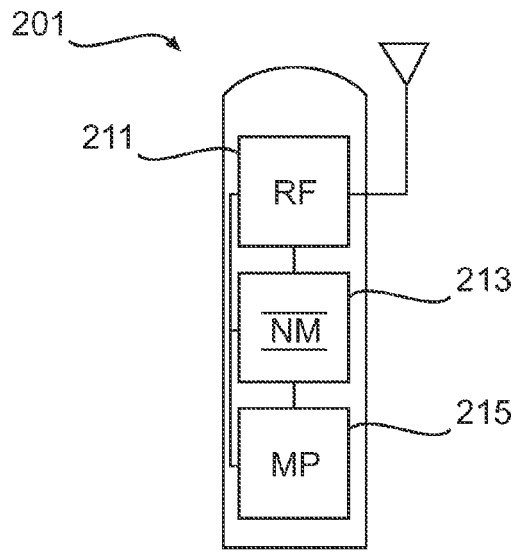
FIG. 2 is a schematic block diagram of a wireless communication device (WCD) constructed in accordance with the present invention.

FIG. 2 is a schematic block diagram of a WCD 201 constructed in accordance with the present invention. The WCD 201 includes an RF circuit 211, for communicating with the satellite, and processing circuitry 213 for processing the communications. By way of example, processing circuitry can include spreaders, despreaders and related logic. The WCD 201 includes a processor 215 that performs control functions, although in many cases the processor 215 is integrated with the processing circuitry 213 and may be further integrated with the RF circuit 211.

Functional Operation

Figure 3:
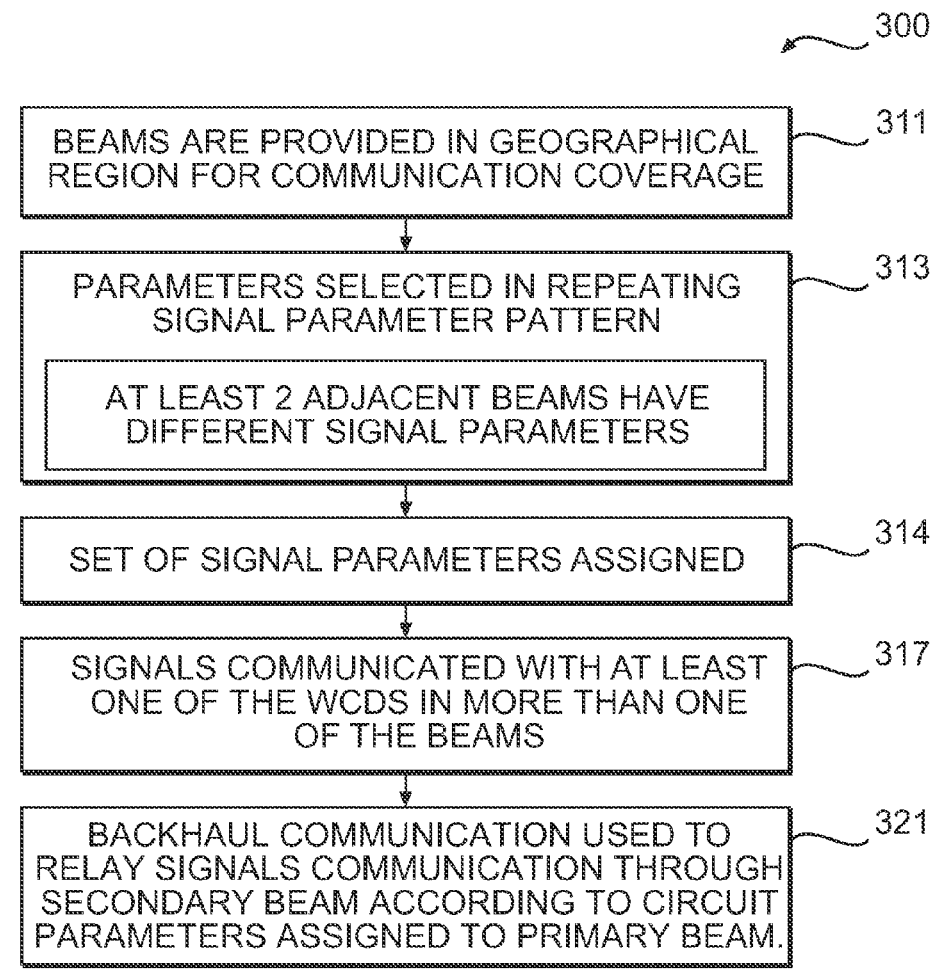
FIG. 3 is a flow diagram showing the functional operation of a multi-beam satellite system in accordance with the invention.

FIG. 3 is a flow diagram 300 showing the functional operation of a multi-beam satellite system in accordance with the invention. The beams are provided (step 311) in a geographical region for communication coverage. Parameters are selected (step 313) in order to establish a signal parameter pattern in which at least two adjacent beams have different signal parameters. A set of signal parameters is assigned (step 314) so that the assigned signal parameters apply to each of the plurality of beams in accordance with the signal parameter pattern. Signals are communicated (step 317) with plural of WCDs, which includes communicating with at least one of the WCDs in more than one of the beams. Backhaul communication corresponding to the communicated signals are used to relay (step 321) the signals between the WCDs and one or more ground stations through gateways. At least a subset of the backhaul communication corresponds to respective ones of the beams. Therefore, the backhaul communication includes signals corresponding to signals communicated with a WCD through a primary beam and a secondary beam, but the communication through the secondary beam is according to circuit parameters assigned to the primary beam.

The operation of FIG. 3 can be implemented with a repeating signal pattern. In that instance, Parameters are selected in step 313 in so as to establish a repeating signal parameter pattern in which at least two adjacent beams have the different signal parameters.

Figure 4:
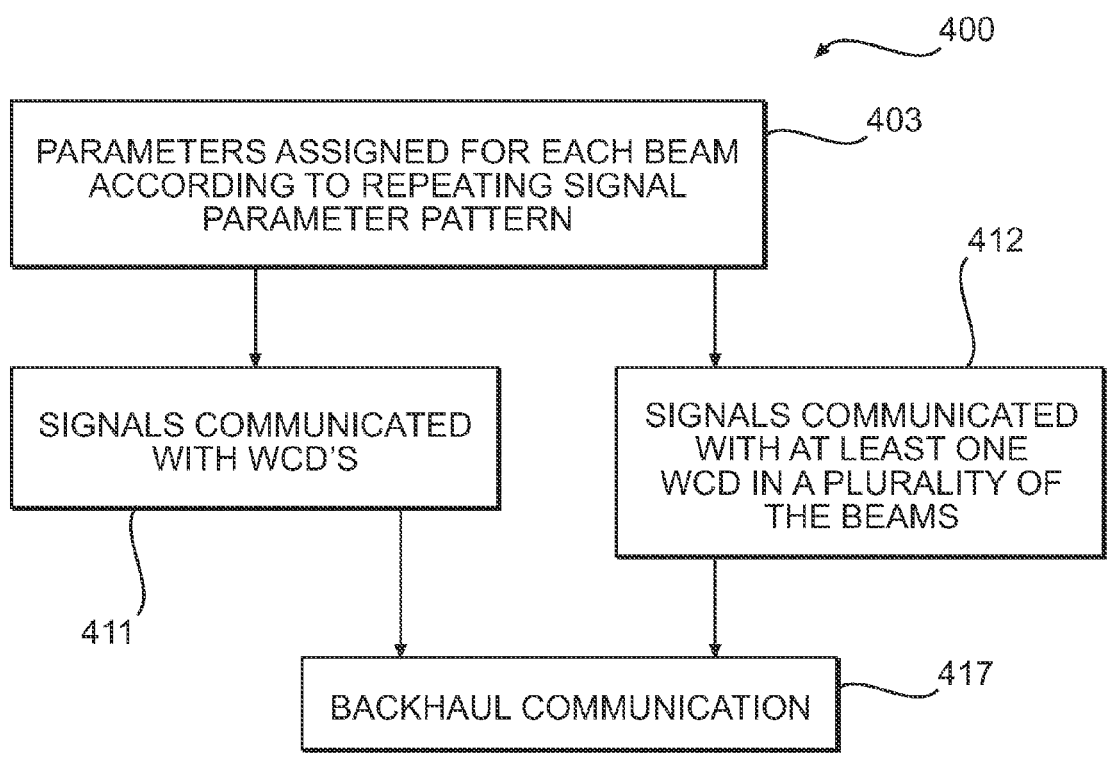
FIG. 4 is a diagram showing the operation of the inventive method.

FIG. 4 is a diagram showing the operation of the inventive method 400. A set of signal parameters is assigned for each of a plurality of beams in accordance with a repeating or non-repeating signal parameter pattern (step 403). The signals are communicated in at least one of an uplink and a downlink, with WCDs (step 411). The communication is performed with at least one WCD in a plurality of the beams (step 412). A backhaul communication is provided (step 417). The backhaul communication (step 417) includes signals corresponding to the communication in the multiple beams from step 412.

Figure 5:
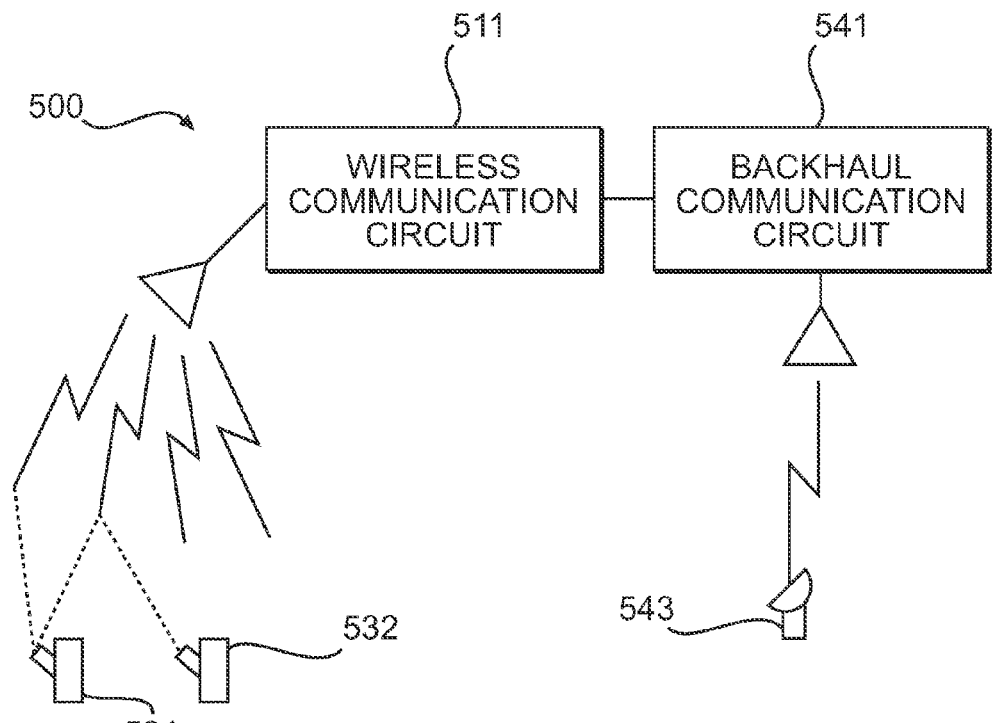
FIG. 5 is a schematic block diagram showing the functional operation of the invention using a communication satellite for implementation.

FIG. 5 is a schematic block diagram showing the functional operation of the invention using a communication satellite 500 for implementation. The satellite 500 includes signal processing circuit which includes an RF circuit or other wireless communication circuit 511. The wireless communication circuit 511 is capable of communicating through a plurality of beams to provide coverage to a geographical region. The RF circuit has a beam coding function that assigns a set of signal parameters for each of the beams in accordance with the repeating signal parameter pattern. The RF circuit 511 provides communication with a plurality of WCDs 531, 532 such that communicating with at least one of the WCDs 531 in at least one of the uplink and downlink occurs in a plurality of the beams. A backhaul communication circuit 541 provides backhaul communication through at least one gateway 543, with the backhaul communication corresponding to the signals communicated by the RF circuit 511. At least a subset of the backhaul communication corresponds to respective ones of the plurality of beams such that the backhaul communication includes signals corresponding to signals communicated with the WCDs communicating through a primary beam and secondary beams.

Figure 6:
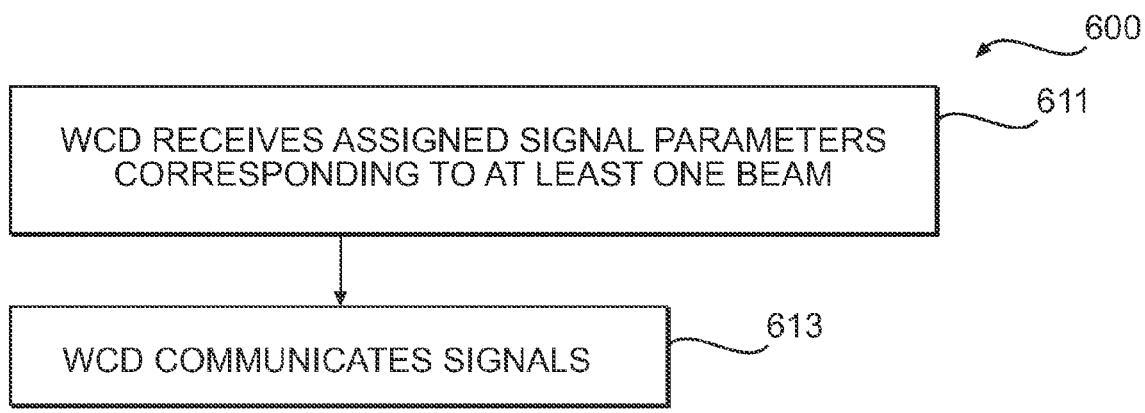
FIG. 6 is a diagram showing the operation of a WCD in accordance with the present invention.

FIG. 6 is a diagram showing the operation 600 of a WCD in accordance with the present invention. The WCD receives an assigned set of signal parameters corresponding to at least one of the plurality of beams (step 611). The WCD then communicates signals (step 613) in one of an uplink or downlink or both in a subset of the multiple beams.

Figure 7:
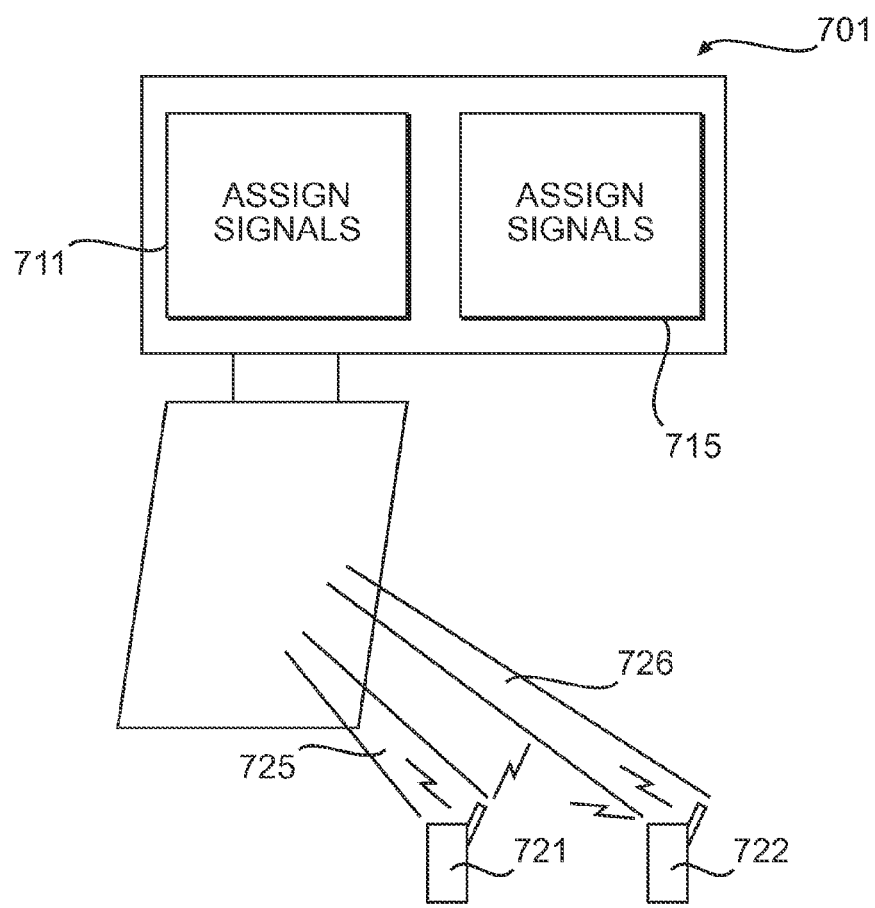
FIG. 7 is a diagram showing the configuration of a communication device used in a multi-beam satellite system in accordance with the present invention.

FIG. 7 is a diagram showing the configuration of a communication device 701 used in a multi-beam satellite system in accordance with the present invention. The multi-beam provides coverage to a geographical region using a repeating signal parameter pattern in which adjacent beams have different signal parameters. The communication device includes means 711 for assigning a set of signal parameters for each of the plurality of beams, and means 715 to process signals. The communications are established with at least one WCD 721, 722 in multiple beams 725, 726. The means 711 for assigning a set of signal parameters and the means 715 may be one or more processors or a signal generators. A means for providing a backhaul communication may be provided, corresponding the backhaul communication circuit 541 providing backhaul communication through at least one gateway 543 as described supra in connection with FIG. 5.

Those skilled in the art will appreciate that the various illustrative logical blocks, modules, circuits, and algorithms described in connection with the embodiments disclosed herein may be implemented as electronic hardware, computer software, or combinations of both. To clearly illustrate this interchangeability of hardware and software, various illustrative components, blocks, modules, circuits, and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, microprocessor, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a microprocessor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. For example, one or more elements can be rearranged and/or combined, or additional elements may be added. Thus, the present invention is not intended to be limited to the embodiments shown herein but is to be accorded the widest scope consistent with the principles and novel features disclosed herein.

What is claimed is:

1. A method for enhancing communication coverage in a multi-beam satellite system in which a plurality of beams provide coverage to a geographical region using a pattern of signal beams, comprising:
   assigning, by a satellite, a respective set of signal parameters to each of the plurality of beams, including assigning a first set of signal parameters to a primary beam and assigning a second set of signal parameters to a secondary beam;
   transmitting, by the satellite, to a plurality of wireless communication devices (WCDs), signals via the plurality of beams;
   communicating, via at least the primary beam and the secondary beam, communication signals with at least one of the plurality of WCDs according to at least a subset of the first set of signal parameters assigned to the primary beam; and
   transmitting, by the satellite, the communication signals received via at least the primary beam and the secondary beam to at least one gateway via a backhaul transmission.

2. The method of claim 1, wherein assigning the respective set of signal parameters includes:
   assigning, by the satellite, the respective set of signal parameters to each of the plurality of beams such that sets of signal parameters assigned to adjacent beams have at least one different signal parameter.

3. The method of claim 1, wherein assigning the respective set of signal parameters includes:
   assigning, by the satellite, the respective set of signal parameters to each of the plurality of beams in accordance with a repeating signal parameter pattern.

4. The method of claim 3, wherein assigning the respective set of signal parameters includes:
   assigning, by the satellite, the respective set of signal parameters to each of the plurality of beams in accordance with a frequency reuse pattern to provide the repeating signal parameter pattern, wherein sets of signal parameters assigned to adjacent beams have different frequency assignments.

5. The method of claim 3, wherein assigning the respective set of signal parameters includes:
   assigning, by the satellite, the respective set of signal parameters to each of the plurality of beams in accordance with a frequency reuse pattern to provide the repeating signal parameter pattern, wherein sets of signal parameters assigned to adjacent beams have a same frequency assignment.

6. The method of claim 1, further including:
   receiving, by the satellite, uplink communication signals via at least the primary beam and the secondary beam according to at least the subset of the first set of signal parameters; and
   combining, by the satellite, the uplink communication signals using at least one of a minimal mean squared error (MMSE) algorithm and a maximal ratio combining (MRC) algorithm, wherein the MRC algorithm adds the signals coherently.

7. The method of claim 6, wherein transmitting the communication signal further includes:
   transmitting, from the satellite, the combined uplink communication signals to the at least one gateway via the backhaul transmission.

8. The method of claim 1, further including:
   receiving, by the satellite, uplink communication signals via the plurality of beams; and
   retransmitting, by the satellite, the received uplink communication signals through the backhaul transmission, wherein a portion of the retransmitted uplink communication signals correspond to respective ones of the plurality of beams and the retransmission includes retransmission of signals received at signal parameters corresponding to at least one beam adjacent to each of the respective ones of the plurality of beams.

9. The method of claim 1, further including:
   receiving, by the satellite, uplink communication signals via the plurality of beams; and
   applying, by the satellite, a combining algorithm to the received uplink communication signals to null at least one interfering transmission.

10. The method of claim 1, further including:
    receiving, by the satellite, return communication signals with the at least one of the plurality of WCDs via the plurality of beams; and
    relaying, by the satellite, the received return communication signals to the backhaul transmission.

11. The method of claim 1 further including:
    receiving, by the satellite, forward communication signals from the backhaul transmission; and
    relaying, by the satellite, the received forward communication signals to the at least one of the plurality of WCDs.

12. The method of claim 1, further including:
    communicating, by the satellite, with the plurality of WCDs using a plurality of different signals along different path lengths; and
    combining the plurality of different signals into composite signals in the communication link.

13. The method of claim 1, further including:
    receiving, by the satellite, the communication signals via at least the primary beam and the secondary beam; and
    transmitting, by the satellite, the communication signals to the at least one gateway, wherein the at least one gateway combines the transmitted communication signals to generate coherently combined communication signals.

14. The method of claim 1, wherein transmitting the communication signals further includes:
   receiving, by the satellite, the communication signals via at least the primary beam and the secondary beam; and
   combining, by the satellite, the communication signals to generate coherently combined communication signals; and
   transmitting, by the satellite, the coherently combined communication signals to the at least one gateway via the backhaul transmission.

15. The method of claim 1, wherein transmitting the communication signals to the at least one gateway in the backhaul transmission includes:
   transmitting, by the satellite, the communication signals in the backhaul transmission through the at least one gateway, wherein at least a subset of the backhaul communication corresponds to respective ones of the plurality of beams such that the backhaul communication includes signals corresponding to composite signals communicated via the satellite with the at least one of the wireless communication devices which are combined from the primary beam and the secondary beam.

16. A satellite for enhancing communication coverage in a multi-beam satellite system in which a plurality of beams provide coverage to a geographical region using a pattern of signal beams, comprising:
   a memory configured to store instructions;
   a processor configured to access the memory and execute the stored instructions, causing the processor to perform a method comprising:
      assigning a respective set of signal parameters to each of the plurality of beams, including assigning a first set of signal parameters to a primary beam and assigning a second set of signal parameters to a secondary beam;
      transmitting to a plurality of wireless communication devices (WCDs), signals via the plurality of beams;
      communicating, via at least the primary beam and the secondary beam, communication signals with at least one of the plurality of WCDs according to at least a subset of the first set of signal parameters assigned to the primary beam; and
      transmitting the communication signals received via at least the primary beam and the secondary beam to at least one gateway via a backhaul transmission.

17. The satellite of claim 16, wherein assigning the respective set of signal parameters to each of the plurality of beams includes:
   assigning the respective set of signal parameters to each of the plurality of beams such that sets of signal parameters assigned to adjacent beams have at least one different signal parameter.

18. The satellite of claim 16, wherein assigning the respective set of signal parameters to each of the plurality of beams includes:
   assigning, by the satellite, the respective set of signal parameters to each of the plurality of beams in accordance with a repeating signal parameter pattern.

19. The satellite of claim 18, wherein assigning the respective set of signal parameters to each of the plurality of beams includes:
   assigning, by the satellite, the respective set of signal parameters to each of the plurality of beams in accordance with a frequency reuse pattern to provide the repeating signal parameter pattern, wherein sets of signal parameters assigned to adjacent beams have different frequency assignments.

20. The satellite of claim 18, wherein assigning the respective set of signal parameters to each of the plurality of beams includes:
   assigning, by the satellite, the respective set of signal parameters to each of the plurality of beams in accordance with a frequency reuse pattern to provide the repeating signal parameter pattern, wherein sets of signal parameters assigned to adjacent beams have a same frequency assignments.

21. The satellite of claim 16, wherein the processor is further configured to perform the method including:
   receiving uplink communication signals via at least the primary beam and the secondary beam according to at least the subset of the first set of signal parameters; and
   combining the uplink communication signals using at least one of a minimal mean squared error (MMSE) algorithm and a maximal ratio combining (MRC) algorithm, wherein the MRC algorithm adds the signals coherently.

22. The satellite of claim 21, wherein transmitting the communication signal further includes:
   transmitting the combined uplink communication signals to the at least one gateway via the backhaul transmission.

23. The satellite of claim 16, wherein the processor is further configured to perform the method including:
   receiving uplink communication signals via the plurality of beams; and
   retransmitting the received uplink communication signals through the backhaul transmission, wherein a portion of the retransmitted uplink communication signals correspond to respective ones of the plurality of beams and the retransmission includes retransmission of signals received at signal parameters corresponding to at least one beam adjacent to each of the respective ones of the plurality of beams.

24. The satellite of claim 16, wherein the processor is further configured to perform the method including:
   receiving uplink communication signals via the plurality of beams; and
   applying a combining algorithm to the received uplink communication signals to null at least one interfering transmission.

25. The satellite of claim 16, wherein the processor is further configured to perform the method including:
   receiving return communication signals with the at least one of the plurality of WCDs via the plurality of beams; and
   relaying the received return communication signals to the backhaul transmission.

26. The satellite of claim 25, wherein the processor is further configured to perform the method including:
   receiving forward communication signals from the backhaul transmission; and
   relaying, by the satellite, the received forward communication signals to the at least one of the plurality of WCDs.

27. The satellite of claim 16, wherein the processor is further configured to perform the method including:
   communicating with the plurality of WCDs using a plurality of different signals along different path lengths; and
   combining the plurality of different signals into composite signals in the communication link.

28. The satellite of claim 16, wherein the processor is further configured to perform the method including:

receiving the communication signals via at least the primary beam and the secondary beam; and transmitting the communication signals to the at least one gateway, wherein the at least one gateway combines the transmitted communication signals to generate coherently combined communication signals.

29. The satellite of claim 16, wherein transmitting the communication signals further includes:

receiving the communication signals via at least the primary beam and the secondary beam; and combining the communication signals to generate coherently combined communication signals; and transmitting the coherently combined communication signals to the at least one gateway via the backhaul transmission.

30. The satellite of claim 16, wherein transmitting the communication signals further includes:

transmitting the communication signals in the backhaul transmission through the at least one gateway, wherein at least a subset of the backhaul communication corresponds to respective ones of the plurality of beams such that the backhaul communication includes signals corresponding to composite signals communicated via the satellite with the at least one of the wireless communication devices which are combined from the primary beam and the secondary beam.

31. A method for using a wireless communication device (WCD) for communicating in a multi-beam satellite system in which a plurality of beams provides coverage to a geographical region using a signal parameter pattern in which at least two adjacent beams have different signal parameters, comprising:

receiving, by the WCD, a first set of signal parameters assigned to a primary beam;

receiving, from a satellite, communication signals via at least the primary beam and a secondary beam according to at least a subset of the first set of signal parameters assigned to the primary beam; and processing, by the WCD, composite communication signals comprising a coherent combination of the communication signals received from the satellite via at least the primary beam and the secondary beam using at least one of a maximal ratio combining (MRC) algorithm or a minimal mean squared error combining (MMSE) algorithm.

32. The method of claim 31, further including:

applying, by the WCD, a combining algorithm to the communication signals received from the plurality of beams to null at least one interfering transmission.

33. The method of claim 31, further including:

receiving, by the WCD, the communication signals using a plurality of different signals for communicating along different path lengths; and combining, by the WCD, the signals in the communication link.

34. A wireless communication device (WCD) for communicating in a multi-beam satellite system in which a plurality of beams provides coverage to a geographical region using a signal parameter pattern in which at least two adjacent beams have different signal parameters, comprising:

a memory storing instructions; and a processor configured to access the memory and execute the instructions to perform a method including:

receiving a first set of signal parameters assigned to a primary beam;

receiving, from a satellite, communication signals via at least the primary beam and a secondary beam according to at least a subset of the first set of signal parameters assigned to the primary beam; and processing composite communication signals comprising a coherent combination of the communication signals received from the satellite via at least the primary beam and the secondary beam using at least one of a maximal ratio combining (MRC) algorithm or a minimal mean squared error combining (MMSE) algorithm.

35. The method of claim 34, wherein the processor is further configured to perform the method including:

applying a combining algorithm to the communication signals received from the plurality of beams to null at least one interfering transmission.

36. The method of claim 34, wherein the processor is further configured to perform the method including:

receiving the communication signals using a plurality of different signals for communicating along different path lengths; and combining the signals in the communication link.

* * * * *